United States Patent
Cain et al.

(10) Patent No.: US 9,244,500 B2
(45) Date of Patent: Jan. 26, 2016

(54) SYSTEM INTEGRATION SUPPORTING COMPLETELY WIRELESS PERIPHERAL APPLICATIONS

(75) Inventors: Gamil A. Cain, El Dorado Hills, CA (US); Jim Walsh, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 657 days.

(21) Appl. No.: 13/113,780

(22) Filed: May 23, 2011

(65) Prior Publication Data

US 2012/0303939 A1    Nov. 29, 2012

(51) Int. Cl.
*H02J 7/00*    (2006.01)
*H02J 5/00*    (2006.01)
*H02J 7/02*    (2006.01)
(Continued)

(52) U.S. Cl.
CPC .............. *G06F 1/1698* (2013.01); *G06F 1/266* (2013.01); *G09G 5/003* (2013.01); *H02J 17/00* (2013.01); *H04L 12/6418* (2013.01); *H04M 1/7253* (2013.01); *H04N 21/4122* (2013.01); *H04N 21/43637* (2013.01); *H04W 4/00* (2013.01); *H04W 52/0296* (2013.01); *G06F 1/26* (2013.01); *G09G 2330/02* (2013.01); *G09G 2370/16* (2013.01); *H02J 5/005* (2013.01); *H02J 7/00* (2013.01); *H02J 7/025* (2013.01)

(58) Field of Classification Search
CPC ............. H02J 5/005; H02J 7/025; H02J 7/00; G06F 1/26
USPC ............................................... 713/1; 320/108
See application file for complete search history.

(56) References Cited

U.S. PATENT DOCUMENTS

| 7,962,186 B2* | 6/2011 | Cui et al. .................... 455/575.7 |
| 2002/0094779 A1* | 7/2002 | Peng .............................. 455/41 |

(Continued)

FOREIGN PATENT DOCUMENTS

| JP | 11-318046 | 11/1999 |
| JP | 2009-500999 | 1/2009 |

(Continued)

OTHER PUBLICATIONS

International Search Report and Written Opinion, PCT/ISA/210, PCT/ISA/220, PCT/ISA/237, mail date, Nov. 29, 2012, a total of 9 pages.

(Continued)

*Primary Examiner* — Jaweed A Abbaszadeh
*Assistant Examiner* — Terrell Johnson
(74) *Attorney, Agent, or Firm* — Pillsbury Winthrop Shaw Pittman LLP (57) ABSTRACT

In accordance with various aspects of the disclosure, a method and apparatus is disclosed that includes features of a host computing device, and a wireless power transmission module and a wireless data transmission module both integrated on a circuit board of the host computing device. The host computing device is configured to transmit power and multi-media data to a peripheral device, upon receipt thereof from the wireless power transmission module and the wireless data transmission module, respectively. The peripheral device is configured to receive wirelessly power and multi-media data from a host computing device, and provide the received power and multi-media data to a wireless power reception module and a wireless data reception module, respectively, for processing, both modules being integrated on a circuit board of the peripheral device.

20 Claims, 5 Drawing Sheets

(51) Int. Cl.
*G06F 1/26* (2006.01)
*G06F 1/16* (2006.01)
*H02J 17/00* (2006.01)
*H04L 12/64* (2006.01)
*H04M 1/725* (2006.01)
*G09G 5/00* (2006.01)
*H04N 21/41* (2011.01)
*H04N 21/4363* (2011.01)
*H04W 4/00* (2009.01)
*H04W 52/02* (2009.01)

(56) References Cited

U.S. PATENT DOCUMENTS

| | | | | |
|---|---|---|---|---|
| 2006/0273817 | A1* | 12/2006 | Hsieh et al. | 324/765 |
| 2007/0140517 | A1* | 6/2007 | Ruzicka et al. | 381/315 |
| 2007/0188297 | A1 | 8/2007 | Nakane et al. | |
| 2008/0005395 | A1* | 1/2008 | Ong et al. | 710/36 |
| 2008/0258679 | A1* | 10/2008 | Manico et al. | 320/106 |
| 2009/0184877 | A1 | 7/2009 | Bommer | |
| 2010/0142509 | A1 | 6/2010 | Zhu et al. | |
| 2010/0144393 | A1* | 6/2010 | Li et al. | 455/566 |
| 2010/0194335 | A1* | 8/2010 | Kirby et al. | 320/108 |
| 2010/0201316 | A1* | 8/2010 | Takada et al. | 320/108 |
| 2010/0214177 | A1 | 8/2010 | Parsche | |
| 2010/0253281 | A1* | 10/2010 | Li | 320/108 |
| 2011/0050164 | A1* | 3/2011 | Partovi et al. | 320/108 |
| 2011/0115432 | A1* | 5/2011 | El-Maleh et al. | 320/108 |
| 2011/0119135 | A1 | 5/2011 | Grilli et al. | |
| 2011/0119144 | A1* | 5/2011 | Grilli et al. | 705/26.1 |
| 2013/0043738 | A1* | 2/2013 | Park et al. | 307/104 |

FOREIGN PATENT DOCUMENTS

| | | |
|---|---|---|
| WO | 2005/101304 | 10/2005 |
| WO | 2007/008608 | 1/2007 |
| WO | 2011/042974 | 4/2011 |

OTHER PUBLICATIONS

Japanese Office Action, Application No. 2012-115705, mail date May 28, 2013, total of 5 pages.
Japanese Office Action, Japanese Application No. 2012-115705, mail date Mar. 18, 2014.
Korean Patent Application No. 2013-7033929, The Notice of Preliminary Rejection Office Action, mail date, Sep. 1, 2014.
European Search Report dated Feb. 6, 2015 in corresponding European Patent Application No. 12790183.3.
Korean Office Action dated Mar. 20, 2015 in corresponding Korean Patent Application No. 2013-7033929.

* cited by examiner

SYSTEM INTEGRATION SUPPORTING COMPLETELY WIRELESS PERIPHERAL APPLICATIONS

BACKGROUND

This disclosure relates generally to the field of wireless transmission and reception of power and data, and in particular, to a method and apparatus for system integration supporting completely wireless peripheral applications.

Some conventional devices can consume content from a host system wirelessly using a wireless enabled display. Some other conventional devices can consume power wirelessly from a source (e.g., for charging). However, devices that can consume content using a wireless peripheral device and also power wirelessly do not exist. Integration of a wireless power subsystem and a wireless data subsystem on the same hardware compute platform for transmission and reception also does not exist in conventional devices. As a result, conventional devices depend upon wires for power while receiving content from a source, wirelessly or otherwise. For example, a conventional system using a projector to project a slideshow presentation received from a laptop or a desktop computer, on a screen or a display requires wired power delivery for the projector to carry out the projection of the slideshow presentation.

DETAILED DESCRIPTION

In the description that follows, like components have been given the same reference numerals, regardless of whether they are shown in different aspects. To illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

In accordance with some aspects of the present disclosure, an apparatus is disclosed that includes a host computing device. A wireless power transmission module and a wireless data transmission module are both integrated on a circuit board of the host computing device. The host computing device is configured to wirelessly transmit power and multi-media data to a peripheral device, upon receipt thereof from the wireless power transmission module and the wireless data transmission module, respectively.

In the apparatus, the host computing device is a desktop personal computer or a mobile computing device. The multi-media data includes one or more of audio data, video data, non-audio-visual data, and combinations thereof, and wherein the multi-media data is independent of data associated with the transmitted power. The host computing device includes an antenna coupled to both the wireless power transmission module and the wireless data transmission module, and configured to synchronously or asynchronously transmit the power and the multi-media data to the peripheral device. Alternatively, the host computing device can include a first antenna coupled to the wireless power transmission module configured to transmit the power to the peripheral device, and a second antenna coupled to the wireless data transmission module configured to transmit the multi-media data to the peripheral device. The host computing device further includes a processor coupled to the wireless power transmission module and the wireless data transmission module and configured to control the wireless power transmission module based upon one or more transmission policies stored in a memory of the host computing device, and to control the wireless data transmission module based upon application data associated with one or more applications stored in the memory. The wireless power transmission module is coupled to and derives source power from a power subsystem on the circuit board, the power subsystem further coupled to an alternating or a direct current power source. In another aspect of the present disclosure, the wireless power transmission module is configured to receive over a bus one or more signals from a processor on the circuit board for determining one or more of an activation time instant of the wireless power transmission module, a duration of time for keeping the wireless power transmission module activated, and an amount of power to be transmitted by the wireless power transmission module. The wireless data transmission module is configured to receive application data processed by a processor on the circuit board.

In accordance with some aspects of the present disclosure, an apparatus is disclosed that includes a peripheral device configured to receive wirelessly power and multi-media data from a host computing device. A wireless power reception module and a wireless data reception module are both integrated on a circuit board of the peripheral device. The peripheral device is configured to provide the received power and multi-media data to the wireless power reception module and the wireless data reception module, respectively, for processing.

In the apparatus, the peripheral device is at least one of a projection device, a display device, a speaker, and an audiovisual device. The apparatus further comprises a battery or a battery module in the peripheral device configured to provide additional power to the peripheral device to compensate for a delay in the reception of the power from the host computing device. The battery module is configured to use at least a portion of the received power for charging. The received multi-media data is used by a processor in the peripheral device to execute one or more applications stored in a memory of the peripheral device. The wireless power reception module and the wireless data reception are coupled to a common antenna in the peripheral device, the common antenna configured to receive synchronously or asynchronously the power and the multi-media data. Alternatively, the peripheral device can include a first antenna coupled to the wireless power reception module configured to receive the power, and a second antenna coupled to the wireless data reception module configured to receive the multi-media data. The received multi-media data includes one or more of audio data, video data, non-audio-visual data, and combinations thereof, and the multi-media data is independent of data associated with the received power.

In an aspect of the disclosure, a method is disclosed that includes, providing at a host computing device a wireless power transmission module and a wireless data transmission module both integrated on a circuit board of the host computing device. The method includes transmitting wirelessly from the host computing device power and multi-media data to a peripheral device, upon receipt thereof from the wireless power transmission module and the wireless data transmission module, respectively. The method further includes deriving source power from a power subsystem on a circuit board of the host computing device prior to the transmitting. The power subsystem is coupled to an alternating or a direct current power source. The method includes configuring using a processor of the host computing device a wireless power transmission module based upon one or more transmission policies stored in a memory of the host computing device, and configuring using the processor a wireless data transmission module based upon application data associated with one or more applications stored in the memory.

In the method, configuring the wireless power transmission module includes receiving over a bus one or more signals from the processor for determining one or more of an activation time instant of the wireless power transmission module, a duration of time for keeping the wireless power transmission module activated, and an amount of power to be transmitted by the wireless power transmission module. Configuring the wireless data transmission module includes receiving application data processed by the processor prior to the transmitting. The transmitting is performed using an antenna coupled to both the wireless power transmission module and the wireless data transmission module, and configured to synchronously or asynchronously transmit the power and the multi-media data to the peripheral device. The transmitting can include transmitting the power from a first antenna coupled to the wireless power transmission module to a peripheral device, and transmitting the multi-media data from a second antenna coupled to the wireless data transmission module to the peripheral device.

In accordance with some aspects of the present disclosure, a method is disclosed that includes providing at a peripheral device a wireless power reception module and a wireless data reception module both integrated on a circuit board of the peripheral device. The method includes receiving wirelessly at the peripheral device power and multi-media data from a host computing device, and providing the received power to the wireless power reception module and the received multi-media data to the wireless data reception module for processing. The method further comprises switching to a battery module in the peripheral device for providing additional power to the peripheral device to compensate for a delay in the reception of the power from the host computing device, and utilizing the received power to charge the battery module. The method includes sending the received multi-media data to a processor of the peripheral device for executing one or more applications stored in a memory of the peripheral device.

In the method, the wireless power reception module and the wireless data reception are coupled to a common antenna in the peripheral device, the common antenna configured to receive synchronously or asynchronously the power and the multi-media data. Alternatively, the power is received at a first antenna coupled to the wireless power reception module and the multi-media data is received at a second antenna coupled to the wireless data reception module.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Figure 1:
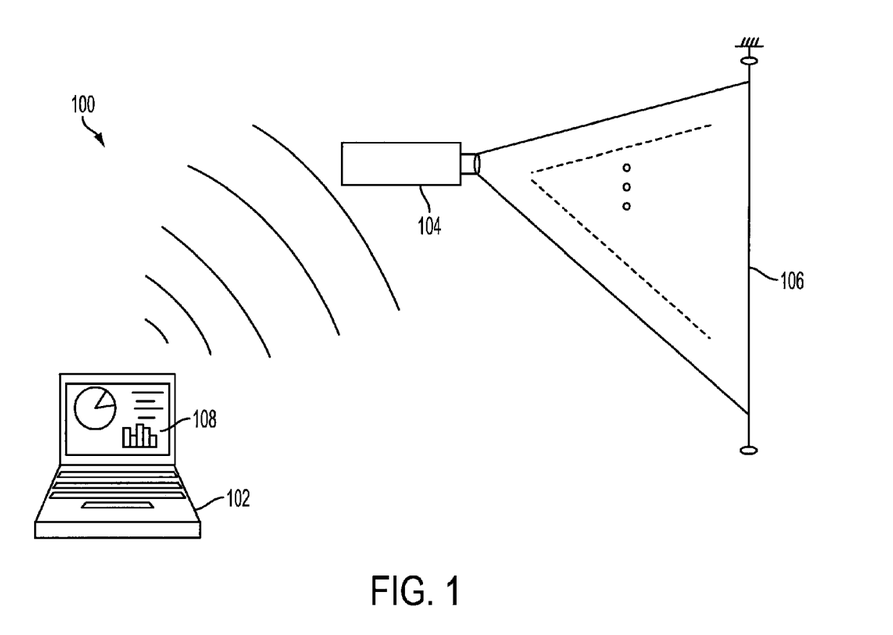
FIG. 1 shows an exemplary diagram of an environment utilizing transmission of wireless power and data transmission from a host computing device to a peripheral device for outputting, in accordance with various aspects of the present disclosure.

Turning now to the various aspects of the disclosure, FIG. 1 shows an exemplary diagram of an environment 100 utilizing wireless power and multi-media data transmission from a host computing device 102 to a peripheral device 104 that receives the wirelessly transmitted power and multi-media data 108 for outputting, for example, on a display device 106. Wirelessly transmitted power and data are shown representatively as arcuate curves of different sizes in FIG. 1. By way of example only and not by way of limitation, host computing device 102 in environment 100 is illustrated as a laptop, peripheral device 104 is illustrated as a projector or projection device, and display device 106 is illustrated as a projection display screen. However, as can be contemplated by one of ordinary skill in the art after reading this disclosure, host computing device 102 may be a desktop personal computer (PC), a mobile computing device (e.g., a smart-phone with computing capabilities), or other types of computing devices (e.g., a personal digital assistant or PDA device) that can store and process various types of data, including multi-media data 108. Likewise, peripheral device 104 can be a speaker, a display device, and/or an audio-visual device, or even another device similar to host computing device 102 but being used for reception and/or display of wireless power and multi-media data 108. For example, peripheral device 104 may be a television or a computer monitor or any visual display unit that is configured to receive wirelessly power and multi-media data 108 from host computing, device 102. Therefore, peripheral device 104, in some examples, can additionally have the capabilities of displaying multi-media data 108, thereby eliminating the display device 106. In various aspects of the disclosure, peripheral device 104 may not be fixed, and can instead be a mobile peripheral device that receives wirelessly power and multi-media data 108 from host computing device 102. In addition, display device 106 can be an active or a passive display device.

It is to be noted that although multi-media data 108 is shown environment 100 as including graphics and/or text, such a representation of multi-media data 108 is for example purposes only, and not as a limitation. Multi-media data 108 broadly encompasses any data or content, other than data related with power or energy transmission from host computing device 102, that is to be output by peripheral device 104. For example, multi-media data 108 can include one or more of audio data, video data, non-audio-visual data (e.g., data files including spreadsheets, text, and/or other application data, or combinations thereof, and metadata associated with the data files), and combinations thereof. In some examples, multi-media data 108 is separate from and independent of data and/or metadata associated with the transmitted power (e.g., power levels required for outputting multi-media data 108, duration of time for which the power is to be transmitted, an activation time instant of power transmission from the host computing device 102, and the like). Accordingly, a user in environment 100 can transmit wirelessly power and data to peripheral device 104 for outputting without a need for cumbersome and unwieldy wires for providing power to peripheral device 104. Additionally, when peripheral device 104 runs out of internal/external battery charge and/or can only be powered using wires but there is no supply point in operational vicinity of peripheral device 104, peripheral device 104 can use wirelessly received power to output multi-media data 108, and/or to charge without disruption in the outputting of content or data (e.g., multi-media data 108). In addition, exemplary scenarios of environment 100 can include a user presenting content, incorporated by multi-media data 108, to one or more business entities in a neat and efficient manner without being concerned with whether or not there is a power supply plug point for powering peripheral device 104 through a power cord. Additionally, although one host computing device 102 and one peripheral device 104 are shown in FIG. 1, various aspects of the disclosure can relate to other number of host computing devices and peripheral devices, as can be contemplated by one of ordinary skill in the art after reading this disclosure. For example, environment 100 may have one host computing device 102 transmitting power and multi-media data 108 wirelessly to two or more peripheral devices. Alternatively, one peripheral device 104 may receive multi-media data 108 from two or more distinct host computing devices on a shared basis. Still alternatively, a network of plurality of host computing devices and peripheral devices may be used in environment 100 for wireless transmission and wireless reception of power and multi-media data, such that host computing device 102 and peripheral device 104 may each be a node in such a network of host computing and peripheral devices sharing wirelessly transmitted power and data.

Wireless transmission of power and multi-media data 108 can be over a noisy channel and can require appropriate modulation-demodulation techniques including but not limited to analog and digital modulation-demodulation. Such techniques can be amplitude modulation (AM), frequency modulation (FM), phase modulation (PM), various forms of digital frequency shift keying (FSK), phase shift keying (PSK), amplitude shift keying (ASK), and combinations thereof. Additionally, multi-media data 108 and other data transmitted by host computing device 102 (e.g., power related data) can be encrypted using various encryption technologies (e.g., public key encryption using the RSA algorithm), as can be contemplated by one of ordinary skill in the art reading this disclosure. Host computing device 102 and peripheral device 104 can exchange handshake signals prior to the transmission (e.g., a Hyper-Text Transfer Protocol (HTTP) handshake). Host computing device 102 and peripheral device 104 can be part of a private communication network including but not limited to a wireless local area network (WLAN), a virtual private network (VPN), a storage area network (SAN), a metropolitan area network (MAN), and the like. Transmission and reception between host computing device 102 and peripheral device 104 can be according to one or more wireless communication standards and protocols including, but not limited to IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and the like. The applicable protocols for wireless communications standard may vary from IEEE 802.11 to IEEE 802.11b (standard 11b) to IEEE 802.11a (standard 11a) to IEEE 802.11g (standard 11g) and to IEEE 802.11n (standard 11n). Additionally, the different protocols or standards may operate within different frequency ranges, such as 5 to 6 gigahertz (GHz) or, alternatively, 2.4 GHz. For example, standard 11a may operate within the higher frequency range. The wireless channels may be 20 megahertz (MHz) wide within the frequency band and may use orthogonal frequency division multiplexing (OFDM) or time division multiplexing (TDM), or combinations thereof. For example, OFDM may be implemented over subcarriers that represent lines, or values, within the frequency domain of the 20 MHz channels and a signal may be transmitted over different subcarriers within the channel. The subcarriers may be orthogonal to each other so that information from multi-media data 108 is extracted off each subcarrier about the wireless signal.

Figure 2:
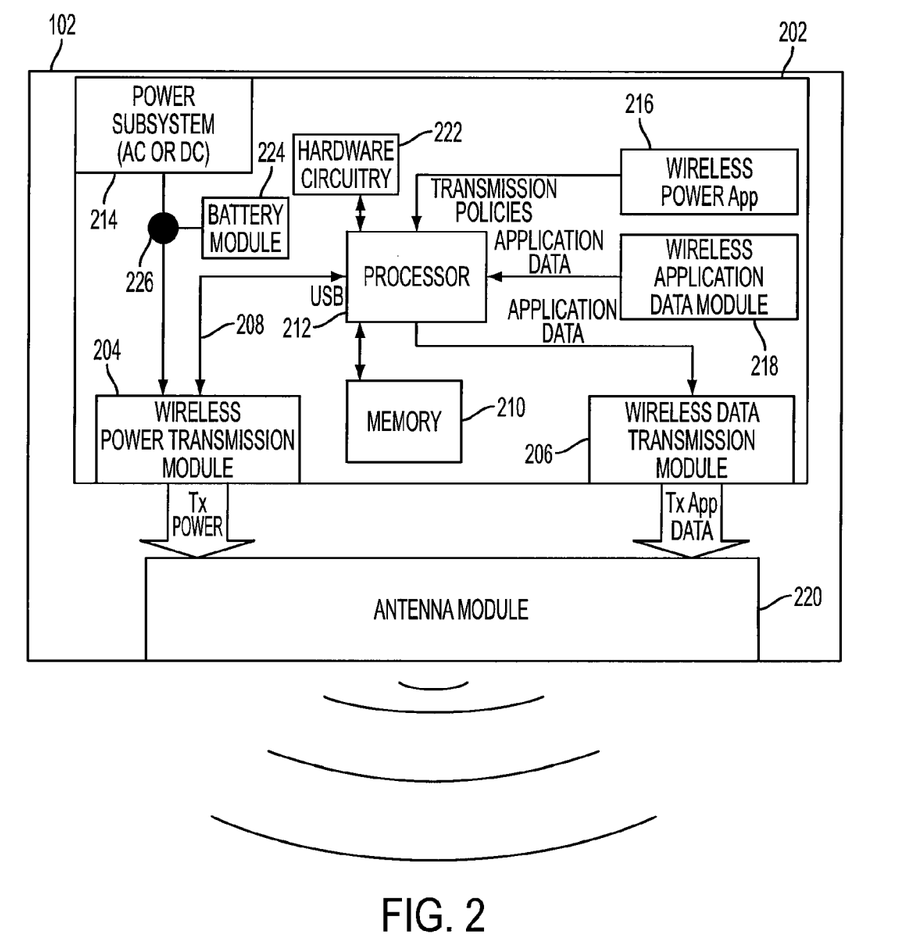
FIG. 2 shows an exemplary block diagram of a host computing device configured to transmit power and data wirelessly, in accordance with various aspects of the present disclosure.

FIG. 2 shows an exemplary block diagram of host computing device 102 that transmits power and data wirelessly, in accordance with various aspects of the present disclosure. Host computing device 102 includes a circuit board 202 on which a wireless power transmission module 204 and a wireless data transmission module 206 are integrated. By way of example only, and not by way of limitation, circuit board 202 is a main motherboard of a desktop computer. Alternatively, circuit board 202 of host computing device 102 may be an integrated chip (IC) module with various circuitry including wireless power transmission module 204 and wireless data transmission module 206 are both integrated on a common hardware platform, for example in a laptop or a PDA device. In yet other alternative aspects, circuit board 202 may be a printed circuit board, or other hardware platform including that of a desktop computer monitor configured to provide power to a notebook computer, a phone, a mouse, or keyboard along with also communicating data (including multi-media data 108) with such peripheral devices. Further, circuit board 202, and components thereof, can be monitored for health and diagnostics by a user of host computing device 102, for example, via a graphical user interface (GUI) on a display screen of host computing device 102 (e.g., the same display screen that displays multi-media data 108 in FIG. 1).

In addition to wireless power transmission module 204 and wireless data transmission module 206, circuit board 202 includes a bus 208 that couples a processor 212 to wireless power transmission module 204. Similar buses couple processor 212 to other components of circuit board 202, as will be described herein. For example, processor 212 is coupled to a memory 210, hardware circuitry 222, wireless power application module 216, and wireless application data module 218 via individual buses, although one or more buses can be arbitrated by processor 212, or an independent bus controller (not shown), to be shared between various components of circuit board 202, as can be contemplated by one of ordinary skill in the art, after reading this disclosure.

Wireless power transmission module 204 includes one or more ports for receiving transmission policies from processor 212 over bus 208. Bus 208 can be a universal serial bus (USB), although other types of serial or parallel buses known to one of ordinary skill in the art may be used. Wireless power transmission module 204 includes a transmission port physically connected to an antenna module 220 to send power for transmission to peripheral device 104. In some aspects of the disclosure, wireless power transmission module 204 may include its own antenna to perform transmission of power. Wireless power transmission module 204 includes other hardware including but not limited to a microcontroller (for communicating with processor 212 via USB or other bus), and a power amplifier. It is to be noted that some examples may include a DC/DC converter, an impedance matching/tuning network, a directional coupler, and circuits to measure the levels of forward and reflected power. In this example, wireless power transmission module 204 can directly draw alternating current (AC) or direct current (DC) power from a power subsystem 214 (AC or DC power). Additionally or alternatively, wireless power transmission module 204 may be configured via a software application, stored for example, in memory 210 and/or wireless power application module 216, which communicates with wireless power transmission module 204 over a standardized bus (e.g., a USB bus) through processor 212. Once integrated on circuit board 202, wireless power transmission module 204 is configurable with transmission policies from the software application residing, for example, in wireless power application module 216. The transmission policies specify, for example, when wireless power is active, how long to keep wireless power active, what power level to transmit at, and other parameters associated with wireless transmission of power from host computing device 102. One exemplary advantage of integrating wireless power transmission module 204 on the same compute platform (e.g., circuit board 202) as wireless data transmission module 206 is that a user of host computing device 102 has control over an amount of power wireless power transmission module 204 draws from power subsystem 214 of host computing device 102. Once configured, the wireless power transmission module 204 functions autonomously and is not dependent on other software or hardware (beyond power subsystem 214) to transmit power to peripheral device 104. Additionally, the user has control of both wireless power and wireless data transmission (e.g., start, stop, and playback speeds for audio/video data, and the like). In one alternative aspect of the disclosure, control of wireless power attributes and wireless data attributes may be integrated at a software level, with software executing on hardware platform provided by circuit board 202.

Wireless data transmission module 206 is configured to receive multi-media data 108, including, for example, application data, after processing from processor 212 over a bus. Application data can reside on hardware components of wireless application data module 218 that has its own memory, although application data can reside upon various distributed memory cores, or a single external or internal on-board memory (e.g., memory 210). Similar to wireless power transmission module 204, wireless data transmission module 206 includes one or more ports for receiving multi-media data 108 and/or other application data after processing by processor 212. Wireless data transmission module 206 includes a transmission port physically connected to antenna module 220 to send transmit power to peripheral device 104. In some aspects of the disclosure, wireless data transmission module 206 may include its own antenna to perform transmission of data separate from another antenna also included in antenna module 220 associated with wireless power transmission module 204. Wireless data transmission module 206 includes other hardware including but not limited to a microcontroller (for communicating with processor 212 via USB or other bus), and a power amplifier. It is to be noted that some examples may include a DC/DC converter, an impedance matching/tuning network, a directional coupler, and circuits to measure the levels of forward and reflected power.

Processor 212 can be one or more microprocessors or microcontrollers such as those made by Intel Corporation of Santa Clara, Calif. (although other vendors may be used). In one example, processor 212 can form a compute complex on circuit board 202 and is configured to facilitate system integration of wireless power transmission module 204 and wireless data transmission module 206. Processor 212 can include one or more microprocessor units, or any other combination of logic circuits capable of executing the functionality of circuit board 202 of host computing device 102, and methods described herein below with respect to FIGS. 4 and 5.

Circuit board 202 includes memory 210 and hardware circuitry 222 coupled to processor 212, although these components may be distributed throughput host computing device 102, or may be part of processor 212. For example, hardware circuitry 222 includes analog to digital converters (ADCs) and digital to analog converters (DACs). Hardware circuitry 222 is configured to provide various control signals, feedback signals and other internal communication signals for enabling functioning of host computing device 102 for transmitting wirelessly power and data to peripheral device 104.

Memory 210 coupled to processor 212 is, in some examples, one or more of the following types of memory: SRAM; BSRAM; or EDRAM. Other examples include the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing functionality of circuit board 202 of host computing device 102, and methods described herein below with respect to FIGS. 4 and 5. In some aspects of the disclosure, memory 210 can be coupled to one or more databases (not shown) for sharing data with processor 212 and/or wireless power application module 216 and wireless application data module 218.

Optional battery module 224 (interchangeably referred to as a battery 224 herein) can be used to provide additional power to wireless power transmission module 204 and/or be used as a DC power source when power subsystem 214 is not coupled to an external power supply (e.g., when host computing device 102 is a laptop). Battery module 224 can supply power through a switch 226 and can be one or more of Nickel Cadmium (NiCd), Nickel Metal Hydride (NiMH), Lithium Ion (LiON), or any other type of smart or "dumb" batteries known to those of ordinary skill in the art.

Circuit board 202 includes power subsystem 214 coupled to battery module 224 and to wireless power transmission module 204 via switch 226. Power subsystem 214 connects to an external power supply (not shown) to receive source power or supply power to circuit board 202, for example, from a mains supply point on a wall. Power subsystem 214 includes hardware components for matching power level of received source power to power levels typical for operation of circuit board 202. For example, power subsystem 214 includes one or more step-down transformers and rectifiers that bring supply voltage and power to a numerical value suitable for charging battery module 224 and for providing power to wireless power transmission module 204. In some aspects of the disclosure, power subsystem 214 includes additional hardware components, for example, a controller circuit(s) (or, a chip) to regulate the output voltage(s) of power subsystem 214 to a constant voltage(s), and protection circuitry to protect from upsurges in power supply. In yet other aspects, power subsystem 214 can be coupled to cooling mechanisms such as fans and/or heat sinks to maintain circuit board 202 and generally host computing device 102 within an operating temperature range (e.g., about 38 degrees Celsius).

Circuit board 202 is attached to antenna module 220 (also interchangeably referred to as antenna 220 herein in some examples). In this example, antenna module 220 is coupled at wireless power transmission module 204 to receive power therefrom and at wireless data transmission module 206 to receive data, including multi-media data 108, therefrom and to transmit the received power and data. In addition to receiving power to be transmitted from wireless power transmission module 204, antenna module 220 can receive data and/or metadata associated with the power to be transmitted from wireless data transmission module 206, which data and/or metadata is independent of data received by antenna module 220 from wireless data transmission module 206 (e.g., multi-media data 108, or other content in application data). Further, antenna module 220 can be coupled to other hardware circuitry on or outside circuit board 202 that belong to host computing device 102. For example, antenna module 220 can be connected to analog and digital transmission circuitry including but not limited to modulator hardware, power amplifier(s), impedance matching circuitry, reflected power sensing circuitry, data reception decoding circuitry such as clock and data recovery circuit(s), data transmission circuitry such as Physical Coding Subsystem, high pass filters to separate data signals from power signals, and the like. Since these hardware components are known to one of ordinary skill in the art, they will not be described in detail herein.

In one aspect of the disclosure, antenna module 220 can be a single common antenna coupled to both wireless power transmission module 204 and wireless data transmission module 206, and configured to synchronously or asynchronously transmit the power and the data, including multi-media data 108 and power related data, to peripheral device 104. In alternative aspects of the disclosure, antenna module 220 includes separate and distinct antennas, for example, a first antenna coupled to wireless power transmission module 204 for transmitting power and power related data to peripheral device 104, and a second antenna coupled to wireless data transmission module 206 to peripheral device 104. In yet another aspect of the disclosure, antenna module 220 can comprise an array of antennas managed by, for example, one or more controllers or processors in antenna module 220, for multiplexing. Alternatively, antenna module 220 may be controlled by processor 212.

Antenna module 220 can transmit power and data, including multi-media data 108, synchronously or asynchronously, in different frequency ranges depending upon specific applications. Power and data, including multi-media data 108, can be transmitted simultaneously. Alternatively, power and data transmission may be time division multiplexed. By way of example only and not by way of limitation, antenna module 220 can operate in one or more of frequencies or frequency range of 13.56 MHz, 7.78 MHz, 950 KHz, 2.4 GHz, 5.8 GHz, although other frequency ranges may be contemplated by one of ordinary skill in the art after reading this disclosure. Transmitted wireless power and data are diagrammatically represented by arcuate curves of different sizes in FIG. 2 below host computing device 102 for illustrative purposes only, and not by way of limitation. Antenna module 220 can include one or more antennas of different types. By way of example only and not by way of limitation, antenna module 220 can include one or more of a helical antenna, a dipole antenna, a monopole antenna, a loop antenna, a patch antenna, a slot antenna, a Planar Inverted "F" (PIFA) antenna, and other types of antennas of suitable geometry and electrical properties depending upon specific transmission parameters associated with the power and data transmission from host computing device 102.

Figure 3:
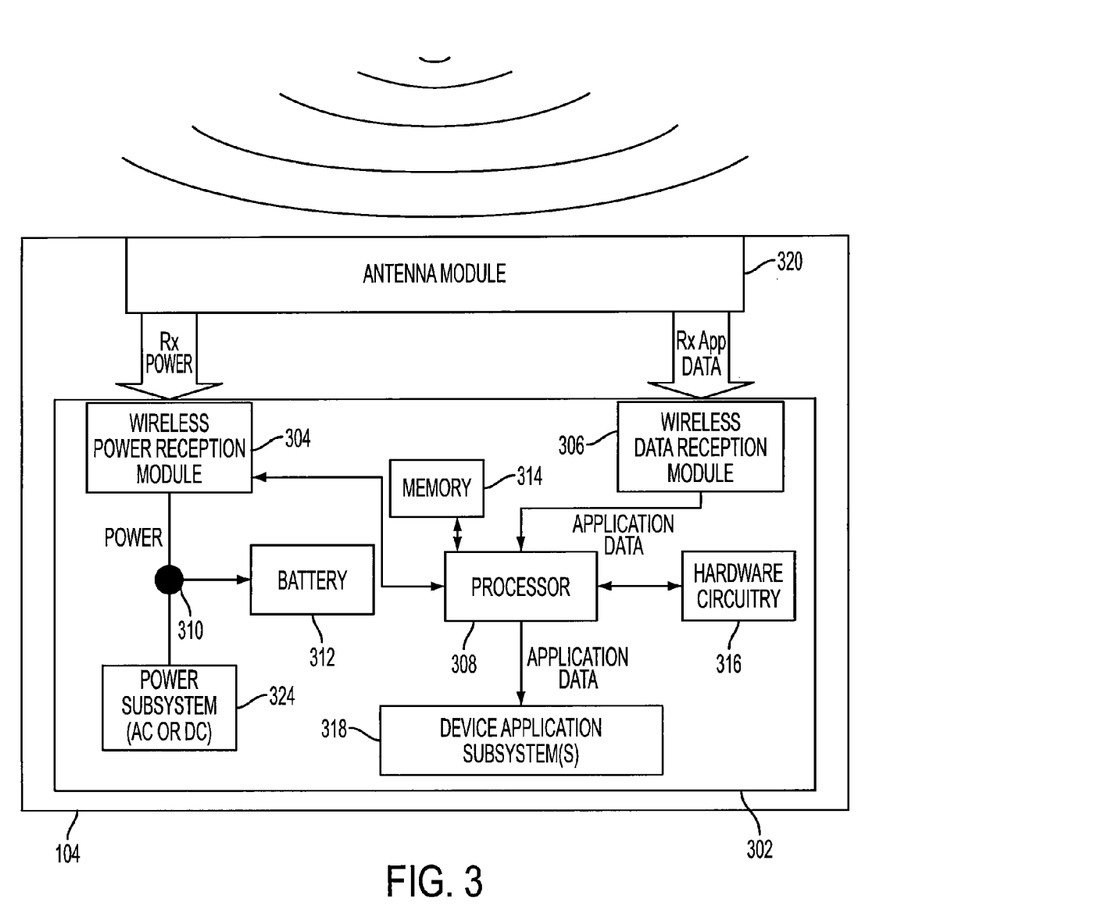
FIG. 3 shows an exemplary block diagram of a peripheral device configured to receive power and data wirelessly, in accordance with various aspects of the present disclosure.

Referring now to FIG. 3, an exemplary block diagram of peripheral device 104 that receives power and data wirelessly, in accordance with various aspects of the present disclosure, is shown. Like host computing device 102, peripheral device 104 also includes a circuit board 302 but configured to receive wirelessly power and data transmitted from host computing device 102. Circuit board 302 includes a wireless power reception module 304 and a wireless data reception module 306 integrated on a common hardware platform. As a result of such integration, peripheral device 104 does not require external power supplied through unwieldy wires from a nearby mains (AC/DC) supply point, which may often not be available within an operating distance for peripheral device 104. By way of example only, and not by way of limitation, circuit board 302 is the main motherboard of peripheral device 104. Alternatively, circuit board 302 of peripheral device 104 may be an integrated chip (IC) module with various circuitry including wireless power reception module 304 and wireless data reception module 306 on a common hardware platform, for example in a projector device that can be moved around and within a field of transmission of host computing device 102 without a limitation of power cord length. In yet other alternative aspects, circuit board 302 may be a printed circuit board, or other hardware platform including but not limited to those of a wireless computer display monitor, a tablet like compute device, a smart-phone or other mobile phone, a mobile music player (e.g., an MP3 player), speakers, and headphones. Further, circuit board 302 can be monitored for health and diagnostics by a user of peripheral device 104, for example, via a graphical user interface (GUI) on a display screen of peripheral device 104, or even on a display screen of host computing device 102.

Wireless power and data transmitted from host computing device 102 are received by peripheral device 104 at an antenna module 320 of peripheral device 104 (interchangeably referred to herein as antenna 320 of peripheral device 104). Received wireless power and data are diagrammatically represented by arcuate curves of different sizes in FIG. 3 above/adjacent peripheral device 104 for illustrative purposes only, and not by way of limitation. Antenna module 320 is coupled to circuit board 302 of peripheral device 104, as shown in FIG. 3. Antenna module 320 of peripheral device 104 is similar in function and structure to antenna module 220, except antenna module 320 is substantially configured to receive transmitted power and data from host computing device 102. Antenna module 320 is coupled to a wireless power reception module 304 and a wireless data reception module 306 such that a common antenna in peripheral device 104 receives synchronously or asynchronously the power and multi-media data 108. In alternative aspects of the disclosure, antenna module 320 of peripheral device 104 can include a first antenna coupled to wireless power reception module 304 configured to receive the power, and a second antenna coupled to wireless data reception module 306 configured to receive the multi-media data 108, the second antenna being separate from the first antenna but included within peripheral device 104. Antenna module 320 can include one or more antennas of different types. By way of example only and not by way of limitation, antenna module 220 can include one or more of a helical antenna, a dipole antenna, a monopole antenna, a loop antenna, a patch antenna, a slot antenna, a Planar Inverted "F" (PIFA) antenna, and other types of antennas of suitable geometry and electrical properties depending upon specific transmission parameters associated with the power and data reception by peripheral device 104. Since hardware construction of antenna module 320 is similar to hardware construction of antenna module 220, one of ordinary skill in the art after reading this disclosure will appreciate the detailed hardware construction of antenna module 320 in view of the hardware description of antenna module 220 above. Accordingly, hardware details of antenna module 320 are not being described herein again.

Circuit board 302 includes a processor 308 coupled to wireless data reception module 306 to receive application data, including multi-media data 108, for processing and forwarding to a peripheral device application subsystem 318. Processor 308 is also coupled to a memory 314 and hardware circuitry 316. Processor 308, memory 314, and hardware circuitry 316 of peripheral device 104 are similar in structure to processor 212, memory 210, and hardware circuitry 222 of host computing device 102, and are therefore not being described in detail herein. In some aspects of the disclosure, processor 308 can optionally be coupled to wireless power reception module 304 for controlling operation of wireless power reception module 304.

Peripheral device application subsystem 318 receives processed application data, including processed multi-media data 108, from processor 308. Peripheral device application subsystem 318 is configured to further output processed application data and content, including multi-media data 108, to a speaker, a screen, and/or a display unit, depending upon the application for which peripheral device 104 is being used. Peripheral device application subsystem 318 can include hardware components as well as software components. For example, peripheral device application subsystem 318 can include a wireless transport driver at the lowest layer, communication protocol middleware, a media engine for decoding, and a user interface at application layer, in addition to decryption hardware and software.

Wireless power reception module 304 is coupled to a battery 312 (also interchangeably referred to as battery module 312 herein) and a power subsystem 324 on circuit board 302 of peripheral device 104 via a switch 310. Wireless power reception module 304 includes a receiver circuit, a rectifier, and may include a voltage regulator.

Wireless data reception module 306 includes receiver circuit for baseband processing, noise rejection circuits and filters, decoders, decryption circuits, demodulation circuit, and other additional hardware required for secure recovery of received data, including multi-media data 108 from host computing device 102. Hardware components of wireless data reception module 306 include "off-the shelf" IEEE 802.11 hardware, for example.

System integration of wireless power reception module 304 and wireless data reception module 306 on a common circuit board 302 of peripheral device 104 enable mobility and flexibility in outputting multi-media data 108 and other application data received from host computing device 102. By way of example only, peripheral device 104 can be a wireless display provided by Intel Corporation of Santa Clara, Calif. but improved and adapted to receive power as well as multi-media data 108 on a common platform, without a need for separate power source or charging device, in accordance with various aspects of this disclosure.

Battery 312 charges and provides power to peripheral device 104 for outputting received multi-media data 108 (including content from host computing device 102) without a power cord or wires to power output of data or content, including multi-media data 108, by peripheral device 104. Battery 312 is similar in hardware to battery 224 of host computing device 102 and will therefore, not be described in detail herein. Wireless power subsystem 324's transient response may or may not require peripheral device 104 to have a significant local power reservoir, e.g., battery 312. For example, if peripheral device 104 suddenly requires higher power but power subsystem 324 takes longer than a threshold time limit (determined, for example, by policies stored in memory 314) to respond by transmitting the necessary power level, peripheral device 104 may need to temporarily draw power from a local reservoir such as battery 312. This can be carried out, for example, to compensate for any delay(s) associated with transmission of power by host computing device 102. Some reasons for such delay can be channel noise, fading, distance, response time of the reflected power sensing circuit in the transmitter, response time for the transmitter power amplifier in host computing device 102 to increase its power output, and combinations thereof. In one aspect of the disclosure, peripheral device 104 is implemented such that wireless power reception module 304 is configured as a battery charger, though other implementations are possible such as a large capacitor in peripheral device 104, as may be contemplated by one of ordinary skill in the art, after reading this disclosure. In some examples, power subsystem 324 of peripheral device 104 includes a charger controller and a DC/DC converter(s) to condition power from an external DC or AC power source, although other components can be incorporated in power subsystem 324 (e.g., protection circuits), as can be contemplated by one of ordinary skill in the art after reading this disclosure.

Various buses (e.g., bus 208) that are part of communication paths within circuit board 202 shown in FIGS. 2 and 3 are exemplary in nature and are not meant to be limiting. For example, these buses (including bus 208) can be an ISA bus; a PCI bus; a PCI-Express bus; an SMBus, an $I^2C$ bus; and can be coupled to or be a part of standard buses such as a USB bus; a PCI or PCIe bus; an Apple Desktop Bus; an RS-232 serial connection; a FireWire bus; a FireWire 800 bus, and/or combinations thereof.

Figure 4:
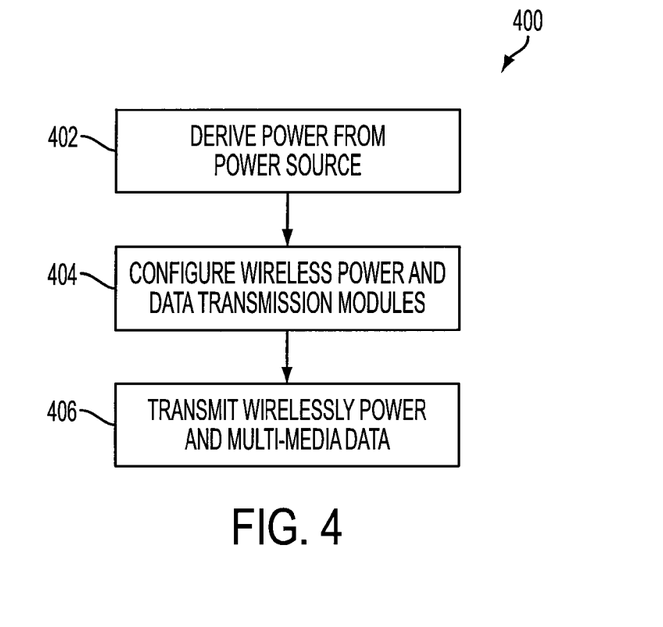
FIG. 4 shows an exemplary flowchart of a method for transmitting power and data wirelessly, in accordance with various aspects of the present disclosure.
Figure 5:
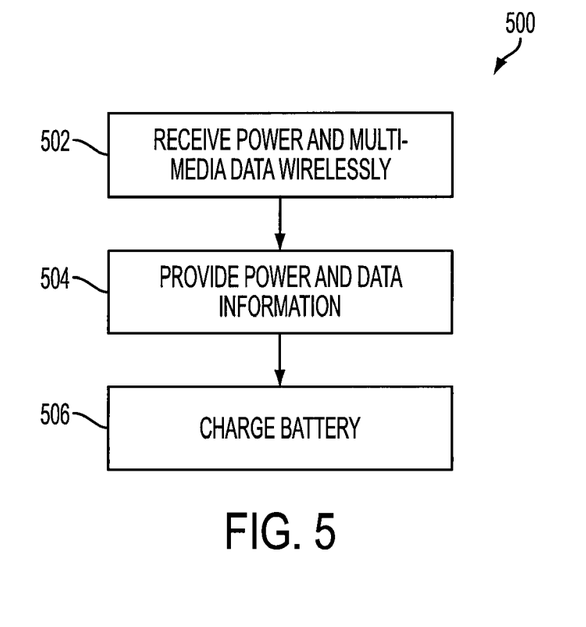
FIG. 5 shows an exemplary flowchart of a method for receiving power and data wirelessly, in accordance with various aspects of the present disclosure.

Referring now to FIGS. 4 and 5, generally, flowcharts 400 and 500 shown in FIGS. 4 and 5 are representative of, for example, a method of making device of FIGS. 1-3, and of example machine readable instructions for implementing various operations carried out by host computing device 102 and peripheral device 104. In this example, the machine readable instructions comprise an algorithm for execution by: (a) a processor (e.g., processor 212), (b) a controller, and/or (c) one or more other suitable processing device(s) within host computing device 102 and/or peripheral device 104, for example. The algorithms may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of host computing device 102 and peripheral device 104 could be implemented by software, hardware, and/or firmware, a combination(s) thereof. Also, some portions of the machine readable instructions represented by the processes of flowcharts 400 and 500 of FIGS. 4 and 5 may be implemented manually at host computing device 102 and peripheral device 104, for example, using a command line interface (CLI)

prompt window operated by a user. Further, although the example algorithm is described with reference to flowcharts 400 and 500, persons of ordinary skill in the art after reading this disclosure will readily appreciate that many other methods of implementing the methods of transmitting and receiving by host computing device 102 and peripheral device 104, respectively, may alternatively be used. For example, the order of execution of the blocks in flowcharts 400 and 500 may be changed, and/or some of the blocks described may be changed, eliminated, or combined.

Turning now to FIG. 4, an exemplary flowchart 400 of a method for transmitting power and data wirelessly, in accordance with various aspects of the present disclosure, will be described with reference back to FIG. 2. Flowchart 400 begins at 402 where host computing device 102 carries out deriving source power from power subsystem 214 on circuit board 202 of host computing device 102 prior to the transmitting. Power subsystem 214 is coupled to an alternating or a direct current power source, as shown in FIG. 2. The procedure at 402 is based upon or occurs after providing at host computing device 102 wireless power transmission module 204 and wireless data transmission module 206 both integrated on circuit board 202 of host computing device 102, although these are not limiting conditions since the procedure at 402 may occur independently or before the providing, as may be contemplated by one of ordinary skill in the art after reading this disclosure.

At 404, using processor 212 of host computing device 102, wireless power transmission module 204 is configured based upon one or more transmission policies stored, for example, in memory 210 of host computing device 102. Alternatively, the transmission policies may be stored in wireless power application module 216, or elsewhere in host computing device 102, as may be contemplated by one ordinary skill in the art after reading this disclosure. Configuring wireless power transmission module 204 includes receiving over bus 208, for example, one or more signals from processor 212 for determining one or more of an activation time instant of wireless power transmission module 204, a duration of time for keeping wireless power transmission module 204 activated, and an amount of power to be transmitted by wireless power transmission module 204. Also at 404, configuring using processor 212 wireless data transmission module 206 based upon application data, including for example, multi-media data 108 and/or other data independent of power related data, associated with one or more applications stored in memory 210 occurs. Alternatively, the application data may be stored in wireless application data module 218, or elsewhere in host computing device 102, as may be contemplated by one ordinary skill in the art after reading this disclosure. Configuring wireless data transmission module 206 comprises receiving application data processed by processor 212 prior to transmitting (described below at 406).

At 406, transmitting wirelessly from host computing device 102 power and multi-media data 108 (in addition to other application data) to peripheral device 104 occurs, upon receipt thereof from wireless power transmission module 204 and wireless data transmission module 206, respectively. Transmitting is performed using antenna module 220 coupled to both wireless power transmission module 204 and wireless data transmission module 206, and configured to synchronously or asynchronously transmit power and multi-media data 108 to peripheral device 104. In an alternative aspect of the disclosure, transmitting may occur such that transmitting the power occurs from a first antenna (not shown but part of antenna module 220) coupled to wireless power transmission module 204, and transmitting multi-media data 108 occurs from a second antenna (not shown but part of antenna module 220) coupled to wireless data transmission module 206.

Turning now to FIG. 5, an exemplary flowchart 500 of a method for receiving power and data wirelessly, in accordance with various aspects of the present disclosure, will be described with reference back to FIG. 3. Flowchart 500 begins at 502 where receiving wirelessly at peripheral device 104 power and multi-media data 108 from host computing device 102 occurs. Receiving occurs, synchronously or asynchronously, at antenna module 320 of peripheral device 104, as described above with reference to FIG. 3. For example, antenna module 320 can include a common antenna for the receiving. Alternatively, the receiving power can be carried out at a first antenna (not shown but part of antenna module 320) coupled to wireless power reception module 304 and multi-media data 108 is received at a second antenna (not shown but part of antenna module 320) coupled to wireless data reception module 306. The procedure at 502 is based upon or occurs after providing at peripheral device 104 wireless power reception module 304 and wireless data reception module 306 both integrated on circuit board 302 of peripheral device 104, although these are not limiting conditions since the procedure at 402 may occur independently or before the providing, as may be contemplated by one of ordinary skill in the art after reading this disclosure.

At 504, providing the received power to wireless power reception module 304 and received multi-media data 108 to wireless data reception module 306 for processing occurs. For example, after receiving multi-media data 108 (and additionally, other application data when present), wireless data reception module 306 carries out sending received multi-media data 108 to processor 308 of peripheral device 104 for executing one or more applications stored in memory 314 of peripheral device 104. Additionally, received multimedia data 108 is further sent to peripheral device application subsystem 318 which then outputs the processed multi-media data 108, for example, on display device 106 or a projection screen.

At 506, utilizing the received power to charge battery module 312 occurs. This is carried out, for example, by switching to battery module 312 in peripheral device 104 for providing additional power to peripheral device 104 to compensate for a delay in the reception of the power from host computing device 102 occurs. The delay may be pre-programmed or calculated by processor 308, for example. Further, charging may occur continuously, or as and when needed.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. The order that the measures and processes for system integration of wireless power and data transmission/reception module from a common hardware platform (e.g., circuit boards 202 and 302) for supporting completely wireless peripheral applications are implemented can also be altered. It is to be noted that although transmitted power is being described here, both power and/or energy can be transmitted and received. Similarly, data associated with power or energy transmitted and received can include metadata, separate from metadata associated with multi-media data 108 and metadata associated with other application data transmitted by host computing device 102. These alterations, improvements, and modifications are intended to be suggested by this disclosure, and are within the spirit and scope of the exemplary aspects of this disclosure. Additionally, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

What is claimed is:

1. A method, comprising:
providing at a host computing device a wireless power transmission module and a wireless data transmission module, wherein both the wireless power transmission module and the wireless data transmission module are integrated on a single common circuit board of the host computing device;
configuring, using a processor of the host computing device, the wireless power transmission module based upon one or more transmission policies, wherein the one or more transmission policies include a time-based transmission policy related to a time instant or duration of an operation of the wireless power transmission module and a power-based transmission policy related to the operation of the wireless power transmission module; and
transmitting wirelessly from the host computing device power and multi-media data to a peripheral device, upon receipt thereof from the wireless power transmission module and the wireless data transmission module, respectively.

2. The method of claim 1 further comprising:
deriving source power from a power subsystem on a circuit board of the host computing device prior to the transmitting, wherein the power subsystem is coupled to an alternating or a direct current power source; and
configuring using the processor the wireless data transmission module based upon application data associated with one or more applications stored in the memory,
wherein the one or more transmission policies are stored in a memory of the host computing device.

3. The method of claim 1, wherein the configuring the wireless power transmission module comprises:
receiving over a bus one or more signals from the processor for determining one or more of an activation time instant of the wireless power transmission module, a duration of time for keeping the wireless power transmission module activated, and an amount of power to be transmitted by the wireless power transmission module.

4. The method of claim 2, wherein the configuring the wireless data transmission module comprises receiving application data processed by the processor prior to the transmitting.

5. The method of claim 1, wherein the multi-media data includes one or more of audio data, video data, non-audio-visual data, and combinations thereof, and wherein the multi-media data is independent of data associated with the transmitted power.

6. The method of claim 1, wherein the host computing device is a desktop personal computer or a mobile computing device.

7. The method of claim 1, wherein the transmitting is performed using an antenna coupled to both the wireless power transmission module and the wireless data transmission module, and configured to synchronously or asynchronously transmit the power and the multi-media data to the peripheral device.

8. The method of claim 1, wherein the transmitting comprises:
transmitting the power from a first antenna coupled to the wireless power transmission module to a peripheral device; and
transmitting the multi-media data from a second antenna coupled to the wireless data transmission module to the peripheral device.

9. A method, comprising:
providing at a peripheral device a wireless power reception module and a wireless data reception module, wherein both the wireless power reception module and the wireless data reception module are integrated on a single common circuit board of the peripheral device;
receiving wirelessly at the peripheral device power and multi-media data from a host computing device; and
providing the received power to the wireless power reception module and the received multi-media data to the wireless data reception module for processing,
wherein, if a time duration to receive a certain power level from the host computing device exceeds a threshold time limit, the peripheral device is configured to temporarily draw power from a battery module in the peripheral device.

10. The method of claim 9 further comprising:
switching to the battery module in the peripheral device for providing additional power to the peripheral device to compensate for a delay associated with the threshold time limit in the reception of the power at the certain power level from the host computing device; and
utilizing the received power to charge the battery module.

11. The method of claim 9 further comprising:
sending the received multi-media data to a processor of the peripheral device for executing one or more applications stored in a memory of the peripheral device.

12. The method of claim 9, wherein the wireless power reception module and the wireless data reception are coupled to a common antenna in the peripheral device, the common antenna configured to receive synchronously or asynchronously the power and the multi-media data.

13. The method of claim 9, wherein the peripheral device is at least one of a projection device, a speaker, a display device, and an audio-visual device.

14. The method of claim 9, wherein the power is received at a first antenna coupled to the wireless power reception module and the multi-media data is received at a second antenna coupled to the wireless data reception module.

15. The method of claim 9, wherein the multi-media data includes one or more of audio data, video data, non-audio-visual data, and combinations thereof, and wherein the multi-media data is independent of data associated with the received power.

16. An apparatus, comprising:
a host computing device; and
a wireless power transmission module and a wireless data transmission module both integrated on a single common circuit board of the host computing device, the host computing device configured to wirelessly transmit power and multi-media data to a peripheral device, upon receipt thereof from the wireless power transmission module and the wireless data transmission module, respectively,
wherein the wireless power transmission module is configured based upon one or more transmission policies, the one or more transmission policies including a time-based transmission policy related to a time instant or duration of an operation of the wireless power transmission module and a power-based transmission policy related to the operation of the wireless power transmission module.

17. The apparatus of claim 16, wherein the host computing device is a desktop personal computer or a mobile computing device.

18. The apparatus of claim 16, wherein the multi-media data includes one or more of audio data, video data, non-audio-visual data, and combinations thereof, and wherein the multi-media data is independent of data associated with the transmitted power.

19. An apparatus, comprising:
   a peripheral device configured to receive wirelessly power and multi-media data from a host computing device; and
   a wireless power reception module and a wireless data reception module both integrated on a single common circuit board of the peripheral device, wherein the peripheral device is configured to provide the received power and multi-media data to the wireless power reception module and the wireless data reception module, respectively, for processing,
   wherein, if a time duration to receive a certain power level from the host computing device exceeds a threshold time limit, the peripheral device is configured to temporarily draw power from a battery module in the peripheral device.

20. The apparatus of claim 19, wherein the peripheral device is at least one of a projection device, a display device, a speaker, and an audio-visual device.

* * * * *